US012784681B2

(12) United States Patent
Lee et al.

(10) Patent No.: US 12,784,681 B2
(45) Date of Patent: Nov. 3, 2026

(54) PIXEL, DISPLAY DEVICE HAVING THE SAME, AND ELECTRONIC DEVICE HAVING THE SAME

(71) Applicant: Samsung Display Co., Ltd., Yongin-si (KR)

(72) Inventors: Jiyoung Lee, Yongin-si (KR); Hyunyoung Choi, Yongin-si (KR); Sang-Gu Lee, Yongin-si (KR); Yongwoo Lee, Yongin-si (KR); Hyung Uk Cho, Yongin-si (KR); Jisong Chae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/096,520

(22) Filed: Mar. 31, 2025

(65) Prior Publication Data

US 2026/0018125 A1 Jan. 15, 2026

(30) Foreign Application Priority Data

Jul. 15, 2024 (KR) ........................ 10-2024-0093263

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01)

(58) Field of Classification Search
CPC ........... G09G 3/3233; G09G 2300/043; G09G 2300/0819; G09G 2310/08
See application file for complete search history.

(56) References Cited

U.S. PATENT DOCUMENTS

| | | | | |
|---|---|---|---|---|
| 10,796,640 | B2 * | 10/2020 | Qing | G09G 3/3266 |
| 10,957,257 | B2 * | 3/2021 | Ma | G09G 3/3233 |
| 11,854,482 | B1 * | 12/2023 | Lu | G09G 3/3233 |
| 12,205,542 | B2 * | 1/2025 | Huang | G09G 3/3233 |

(Continued)

FOREIGN PATENT DOCUMENTS

| | | | |
|---|---|---|---|
| CN | 113160754 | A | 7/2021 |
| KR | 10-2022-0146220 | A | 11/2022 |

(Continued)

*Primary Examiner* — Benyam Ketema

(74) *Attorney, Agent, or Firm* — Womble Bond Dickinson (US) LLP

(57) ABSTRACT

A pixel includes a first transistor including a gate electrode connected to a first node, and a second electrode connected to a second node, a second transistor including a first electrode connected to the first node, a third transistor including a gate electrode to receive a second gate signal, and a first electrode connected to a third node, a fourth transistor including a second electrode connected to the first node, a fifth transistor including a first electrode connected to the second node, and a second electrode connected to the third node, a first capacitor including a first electrode connected to the first node, a second capacitor including a first electrode connected to the second node, and a second electrode to receive the second gate signal, and a light-emitting element including a first electrode connected to the third node, and a second electrode to receive a second power voltage.

20 Claims, 11 Drawing Sheets

(56) References Cited

U.S. PATENT DOCUMENTS 12,223,909 B2* 2/2025 Liu .................... G09G 3/3258
12,293,712 B2* 5/2025 Huang .................... G09G 3/3233
12,518,688 B2* 1/2026 Tang .................... G09G 3/32
12,592,191 B2* 3/2026 Yu .................... G09G 3/3233
2005/0110730 A1* 5/2005 Kim .................... G09G 3/3233 345/82
2009/0309816 A1* 12/2009 Choi .................... G09G 3/3233 345/76
2010/0033477 A1* 2/2010 Yamashita .................... G09G 3/3233 345/215
2010/0265166 A1* 10/2010 Kang .................... G09G 3/3233 345/76
2011/0025659 A1* 2/2011 Kwak .................... G09G 3/3233 345/80
2011/0084947 A1* 4/2011 Chung .................... G09G 3/3233 345/76
2011/0199357 A1* 8/2011 Chung .................... G09G 3/3233 345/76
2012/0038612 A1* 2/2012 Chung .................... G09G 3/3233 345/82
2012/0038617 A1* 2/2012 Chung .................... H04N 13/341 345/212
2013/0043802 A1* 2/2013 Han .................... G09G 3/3233 315/240
2014/0332775 A1* 11/2014 Chang .................... G09G 3/3233 257/40
2014/0333512 A1* 11/2014 In .................... G09G 3/3233 345/76
2014/0354517 A1* 12/2014 Chung .................... G09G 3/3258 345/76
2015/0364090 A1* 12/2015 Kim .................... G09G 3/3233 345/78
2018/0006263 A1* 1/2018 Yoon .................... G09G 3/3233
2019/0259331 A1* 8/2019 Na .................... G09G 3/3233
2020/0320934 A1* 10/2020 Ma .................... G09G 3/3258
2021/0012718 A1* 1/2021 Kang .................... G09G 3/3258
2024/0005860 A1* 1/2024 Kim .................... G09G 3/3233
2024/0212584 A1* 6/2024 Kim .................... G09G 3/32
2025/0054437 A1* 2/2025 Lee .................... G09G 3/3233
2025/0087156 A1* 3/2025 Lee .................... G09G 3/3233
2025/0265994 A1* 8/2025 Kim .................... G09G 3/2007
2026/0004742 A1* 1/2026 Lee .................... G09G 3/3233
2026/0018124 A1* 1/2026 Lee .................... G09G 3/3233

FOREIGN PATENT DOCUMENTS

KR 10-2023-0066201 A 5/2023
KR 10-2023-0123556 A 8/2023

* cited by examiner

PIXEL, DISPLAY DEVICE HAVING THE SAME, AND ELECTRONIC DEVICE HAVING THE SAME

CROSS-REFERENCE TO RELATED APPLICATION

The present application claims priority to, and the benefit of, Korean Patent Application No. 10-2024-0093263, filed on Jul. 15, 2024, in the Korean Intellectual Property Office, the entire disclosure of which is incorporated herein by reference.

BACKGROUND

1. Field

The present disclosure relates to a pixel and a display device having the same.

2. Description of the Related Art

A pixel emits light based on a data voltage and includes a transistor (e.g., a thin film transistor (TFT)) that controls driving of the pixel. A display device (e.g., an organic light-emitting display device) may display images in a progressive emission method in which rows of pixels emit light sequentially, or in a "simultaneous" emission method in which all pixels emit light concurrently or substantially simultaneously after sequential data writing is completed.

To improve defective characteristics of displays, such as luminance deviation between pixels, and the like, a display device driven by the simultaneous emission method may further include components inside a pixel to compensate for a threshold voltage of a driving transistor, initialize an anode of an organic light-emitting diode, etc. However, when the components for the threshold voltage compensation and the initialization are added, lines and transistors are also added, which causes an increase in pixel size and a difficulty in implementing high resolution.

Accordingly, because a plurality of pixels may be integrated within a narrow area in a high-resolution display device, it may be suitable to develop a high-density pixel and a display device including the same.

The aforementioned background technology is technical information that is not necessarily prior art disclosed to the public before the application of the present disclosure.

SUMMARY

Some embodiments according to the present disclosure provide a pixel, and a display device including the same. The present disclosure is not limited to the above, and other aspects of the present disclosure will be understood by the following description and will be more apparent from the embodiments of the present disclosure. Further, it will be readily understood that the aspects of the present disclosure can be realized by the means set forth in the appended claims and combinations thereof.

Additional aspects will be set forth in part in the description which follows and, in part, will be apparent from the description, or may be learned by practice of the presented embodiments.

According to an aspect of one or more embodiments, a pixel includes a first transistor including a gate electrode connected to a first node, a first electrode to receive a first power voltage, and a second electrode connected to a second node, a second transistor including a gate electrode to receive a first gate signal, a first electrode connected to the first node, and a second electrode to receive a data voltage, a third transistor including a gate electrode to receive a second gate signal, a first electrode connected to a third node, and a second electrode, a fourth transistor including a gate electrode to receive a third gate signal, a first electrode to receive a third power voltage, and a second electrode connected to the first node, a fifth transistor including a gate electrode to receive a first emission control signal, a first electrode connected to the second node, and a second electrode connected to the third node, a first capacitor including a first electrode connected to the first node, and a second electrode, a second capacitor including a first electrode connected to the second node, and a second electrode to receive the second gate signal, and a light-emitting element including a first electrode connected to the third node, and a second electrode to receive a second power voltage.

The pixel may further include a third capacitor including a first electrode to receive the first power voltage, and a second electrode connected to the second node.

The second electrode of the third transistor may be for receiving an initialization voltage.

The pixel may further include a sixth transistor including a gate electrode to receive a second emission control signal, a first electrode connected to the second node, and a second electrode connected to a fourth node, and a third capacitor including a first electrode connected to the fourth node, and a second electrode to receive the second power voltage, wherein the second electrode of the first capacitor is connected to the fourth node.

The pixel may further include a sixth transistor including a gate electrode to receive a second emission control signal, a first electrode connected to the second node, and a second electrode connected to a fourth node, and a third capacitor including a first electrode connected to the fourth node, and a second electrode to receive the second power voltage, wherein the first electrode of the fifth transistor is connected to the fourth node, and the second electrode of the first capacitor is connected to the fourth node.

The first electrode of the third transistor may be connected to the fourth node.

The pixel may further include a sixth transistor including a gate electrode to receive a second emission control signal, a first electrode to receive the first power voltage, and a second electrode connected to a fourth node, wherein the first electrode of the first transistor is connected to the fourth node.

A threshold voltage of the first transistor may be configured to be compensated when the second gate signal changes from a first signal to a second signal, and when the third gate signal is the first signal.

When the first transistor is turned on, a voltage applied to the gate electrode of the first transistor may be equal to a sum of a voltage applied to the second electrode of the first transistor and the threshold voltage of the first transistor.

A compensated threshold voltage may be configured to be maintained for the first transistor when the first transistor, the second transistor, the third transistor, the fourth transistor, and the fifth transistor are turned off, and when the first gate signal, the second gate signal, the third gate signal, and the first emission control signal are a second signal.

According to an aspect of one or more other embodiments, a display device includes a scan driver for transmitting scan signals to scan lines, a data driver for transmitting data signals to data lines, a display unit including pixels connected to the scan lines and the data lines, and configured to emit light according to corresponding data signals to display an image, and a controller for controlling the scan driver and the data driver, for generating the data signals, and for applying the data signals to the data driver, wherein the pixels include a first transistor including a gate electrode connected to a first node, a first electrode to receive a first power voltage, and a second electrode connected to a second node, a second transistor including a gate electrode to receive a first gate signal, a first electrode connected to the first node, and a second electrode to receive a data voltage, a third transistor including a gate electrode to receive a second gate signal, a first electrode connected to a third node, and a second electrode, a fourth transistor including a gate electrode to receive a third gate signal, a first electrode to receive a third power voltage, and a second electrode connected to the first node, a fifth transistor including a gate electrode to receive a first emission control signal, a first electrode connected to the second node, and a second electrode connected to the third node, a first capacitor including a first electrode connected to the first node, and a second electrode, a second capacitor including a first electrode connected to the second node, and a second electrode to receive the second gate signal, and a light-emitting element including a first electrode connected to the third node, and a second electrode to receive the second power voltage.

The pixels may further include a third capacitor including a first electrode to receive the first power voltage, and a second electrode connected to the second node.

The second electrode of the third transistor may be configured to receive an initialization voltage.

The pixels may further include a sixth transistor including a gate electrode to receive a second emission control signal, a first electrode connected to the second node, and a second electrode connected to a fourth node, and a third capacitor including a first electrode connected to the fourth node, and a second electrode to receive the second power voltage, and wherein the second electrode of the first capacitor is connected to the fourth node.

The pixels may further include a sixth transistor including a gate electrode to receive a second emission control signal, a first electrode connected to the second node, and a second electrode connected to a fourth node, and a third capacitor including a first electrode connected to the fourth node, and a second electrode to receive the second power voltage, wherein the first electrode of the fifth transistor is connected to the fourth node, and wherein the second electrode of the first capacitor is connected to the fourth node.

The first electrode of the third transistor may be connected to the fourth node.

The pixels may further include a sixth transistor including a gate electrode to receive a second emission control signal, a first electrode to receive the first power voltage, and a second electrode connected to a fourth node, wherein the first electrode of the first transistor is connected to the fourth node.

A threshold voltage of the first transistor may be configured to be compensated when the second gate signal changes from a first signal to a second signal, and when the third gate signal is the first signal.

When the first transistor is turned on, a voltage applied to the gate electrode of the first transistor may be equal to a sum of a voltage applied to the second electrode of the first transistor and the threshold voltage of the first transistor.

A compensated threshold voltage may be configured to be maintained for the first transistor when the first transistor, the second transistor, the third transistor, the fourth transistor, and the fifth transistor are turned off, and when the first gate signal, the second gate signal, the third gate signal, and the first emission control signal are a second signal.

According to an aspect of one or more other embodiments, an electronic device includes a display device including a scan driver for transmitting scan signals to scan lines, a data driver for transmitting data signals to data lines, a display unit including pixels connected to the scan lines and the data lines, and configured to emit light according to corresponding data signals to display an image, and a controller for controlling the scan driver and the data driver, for generating the data signals, and for applying the data signals to the data driver, wherein the pixels include a first transistor including a gate electrode connected to a first node, a first electrode to receive a first power voltage, and a second electrode connected to a second node, a second transistor including a gate electrode to receive a first gate signal, a first electrode connected to the first node, and a second electrode to receive a data voltage, a third transistor including a gate electrode to receive a second gate signal, a first electrode connected to a third node, and a second electrode, a fourth transistor including a gate electrode to receive a third gate signal, a first electrode to receive a third power voltage, and a second electrode connected to the first node, a fifth transistor including a gate electrode to receive a first emission control signal, a first electrode connected to the second node, and a second electrode connected to the third node, a first capacitor including a first electrode connected to the first node, and a second electrode, a second capacitor including a first electrode connected to the second node, and a second electrode to receive the second gate signal, and a light-emitting element including a first electrode connected to the third node, and a second electrode to receive the second power voltage.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, a head-mounted display (HMD), a virtual reality (VR) device, or an augmented reality (AR) device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
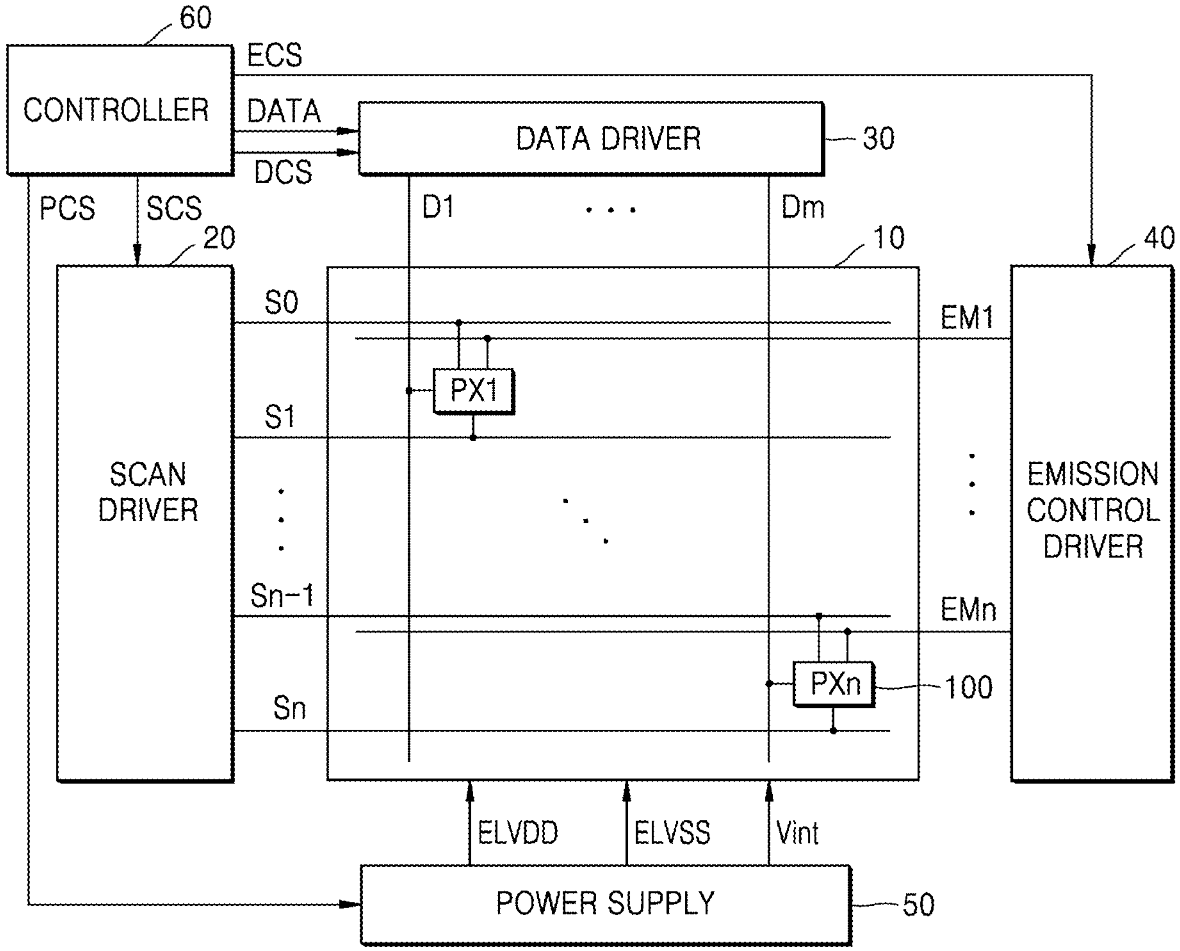
FIG. 1 is a block diagram illustrating a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A term "on" used in association with an element state may refer to an activated state of the element, and a term "off" may refer to a deactivated state of the element. A term "on" used in association with a signal received by an element may be referred to as a signal that activates the element, and a term "off" may refer to a signal that deactivates the element. An element may be activated by a high or low voltage. For example, a P-type transistor may be activated by a low voltage. An N-type transistor may be activated by a high voltage. Accordingly, it should be understood that "on" voltages for the P-type transistor and the N-type transistor have opposite voltage levels (low vs. high).

FIG. 1 is a block diagram illustrating a display device according to one or more embodiments of the present disclosure.

Referring to FIG. 1, a display device according to one or more embodiments of the present disclosure may include a display unit 10 including a plurality of pixels PX1 to PXn, a scan driver 20, a data driver 30, an emission control driver 40, a power supply 50, and a controller 60.

In one or more embodiments, each of the plurality of pixels PX1 to PXn may be connected to at least one corresponding scan line among a plurality of scan lines S1 to Sn connected to the display unit 10, at least one corresponding emission control line among a plurality of emission control lines EM1 to EMn, and at least one corresponding data line among a plurality of data lines D1 to Dm.

In one or more embodiments, each of the plurality of pixels PX1 to PXn may be connected to a power supply line, which is connected to the display unit 10, to receive a first power voltage ELVDD, a second power voltage ELVSS, and an initialization voltage Vint.

In one or more embodiments, the display unit 10 may include the plurality of pixels PX1 to PXn arranged approximately in a matrix form. Although not particularly limited, the plurality of scan lines S1 to Sn and the plurality of emission control lines EM1 to EMn may extend approximately in a row direction in the arrangement of the pixels and may be substantially parallel to one another, and the plurality of data lines D1 to Dm may extend approximately in a column direction and may be substantially parallel to one another.

In one or more embodiments, each of the plurality of pixels PX1 to PXn of the display unit 10 may be connected to two corresponding scan lines. That is, a corresponding pixel may be connected to a scan line corresponding to a pixel row in which the corresponding pixel is included, and may be connected to a scan line corresponding to a previous pixel row of the pixel row. For example, each of a plurality of pixels included in a first pixel row may be connected to a first scan line S1 and a dummy scan line S0. Likewise, each of a plurality of pixels included in an n-th pixel row may be connected to an n-th scan line Sn corresponding to the n-th pixel row, which is the corresponding pixel row, and an n−1-th scan line Sn−1 corresponding to an n−1-th pixel row, which is a previous pixel row of the n-th pixel row.

In one or more embodiments, the plurality of pixels PX1 to PXn may emit light of corresponding luminance, respectively, by driving currents supplied to organic light-emitting diodes according to corresponding data signals transmitted through the plurality of data lines D1 to Dm.

Meanwhile, the display unit 10 may be referred to as a display panel. In the present disclosure, the display panel may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), or may be implemented as other types of flat panel displays or flexible displays.

In one or more embodiments, the scan driver 20 may generate scan signals corresponding to the respective pixels, and may transmit the scan signals through the plurality of scan lines S1 to Sn. That is, the scan driver 20 may transmit the scan signals respectively to the plurality of pixels included in each pixel row through the corresponding scan lines. For example, the scan driver 20 may generate a plurality of scan signals by receiving a scan-driving control signal SCS from the controller 60, and may sequentially supply the scan signals to the plurality of scan lines S1 to Sn connected to each pixel row.

In one or more embodiments, the data driver 30 may transmit a data signal to each pixel through the plurality of data lines D1 to Dm. For example, the data driver 30 may receive a data-driving control signal DCS from the controller 60, and may apply data signals corresponding to the plurality of data lines D1 to Dm connected respectively to the plurality of pixels included in each pixel row.

In one or more embodiments, the emission control driver 40 may be connected to the plurality of emission control lines EM1 to EMn connected to the display unit 10, which includes the plurality of pixels PX1 to PXn arranged in the matrix form. That is, the plurality of emission control lines EM1 to EMn, which extend substantially in parallel to one another while facing the plurality of pixels approximately in the row direction, may connect each of the plurality of pixels and the emission control driver 40.

In one or more embodiments, the emission control driver 40 may generate emission control signals corresponding to the respective pixels, and may transmit the generated emission control signals through the plurality of emission control lines EM1 to EMn. Each pixel that receives the emission control signal may be controlled to emit an image according to an image data signal, in response to control of the emission control signal. That is, an operation of an emission control transistor included in each pixel can be controlled in response to an emission control signal transmitted through a corresponding emission control line, and accordingly, an organic light-emitting diode connected to the emission control transistor may or may not emit light at a brightness according to a driving current corresponding to a data signal.

In one or more embodiments, the power supply 50 may supply a first power voltage ELVDD, a second power voltage ELVSS, and an initialization voltage Vint to each pixel of the display unit 10. For example, the first power voltage ELVDD may be a corresponding high-level voltage, and the second power voltage ELVSS may be a voltage lower than the first power voltage ELVDD or a ground voltage. For example, the initialization voltage Vint may be a voltage value that is equal to or lower than the second power voltage ELVSS.

Meanwhile, although the voltage values of the first power voltage ELVDD, the second power voltage ELVSS, and the initialization voltage Vint are not particularly limited, those voltage values may be set or controlled under control of a power control signal PCS transmitted from the controller 60.

In one or more embodiments, the controller 60 may convert a plurality of image signals transmitted from outside into a plurality of image data signals DATA, and may transmit the plurality of image data signals DATA to the data driver 30. In addition, the controller 60 may generate control signals for controlling operations of the scan driver 20, the emission control driver 40, and the data driver 30 by receiving a vertical synchronization signal, a horizontal synchronization signal, and a clock signal, in one or more embodiments, and may transmit the generated control signals to the corresponding drivers. That is, the controller 60 may generate and may transmit a scan-driving control signal SCS that controls the scan driver 20, an emission-driving control signal ECS that controls the operation of the emission control driver 40, and a data-driving control signal DCS that controls the data driver 30. Additionally, the controller 60 may generate a power control signal PCS for controlling the operation of the power supply 50, and may transmit the power control signal PCS to the power supply 50.

In one or more embodiments, the display device may further include a reference voltage generator, in one or more embodiments. For example, the reference voltage generator may generate a reference voltage VREF based on a control signal received from the controller 60. The reference voltage generator may apply the reference voltage VREF to the data driver 30. The reference voltage VREF may have a value corresponding to each data signal DATA. Meanwhile, the reference voltage generator may be arranged within the controller 60 or within the data driver 30.

In one or more embodiments, the data driver 30 may receive the data-driving control signal DCS from the controller 60, and the reference voltage VREF from the reference voltage generator. The data driver 30 may convert the data signal DATA into an analog data voltage VDATA using the reference voltage VREF. For example, the data driver 30 may output the data voltage VDATA to the data line.

Meanwhile, in one or more embodiments of the present disclosure, the display device may operate during one frame period, which is divided into a first initialization period P1 to initialize a node A, a second initialization period P2 to initialize a node G, a third initialization period to initialize a node S, a compensation period P4 to compensate for a threshold voltage of a first transistor, an off period P5 in which transistors included in the pixels of the display device are turned off, a writing period P6 to sequentially write data voltages in the pixels, and an emission period P7 in which the pixels concurrently or substantially simultaneously emit light. The operation of the display device of the present disclosure will be described in detail later.

The display device according to one or more embodiments is a device that displays a moving image and/or a still image. The display device may be applied to portable electronic devices such as mobile phones, smartphones, tablet personal computers (PCs), mobile communication terminals, electronic notebooks, electronic books, portable multimedia players (PMPs), navigations, and ultra-mobile PCs (UMPCs). For example, the display device may be applied to a display unit of a television, a laptop computer, a monitor, a billboard, or the Internet of Things (IoT). Alternatively, in one or more embodiments, the display device may be applied to a smartwatch, a watch phone, a virtual reality (VR) device, an augmented reality (AR) device, and/or a head-mounted display device (HMD) (e.g., for implementing virtual reality and/or augmented reality).

Figure 2:
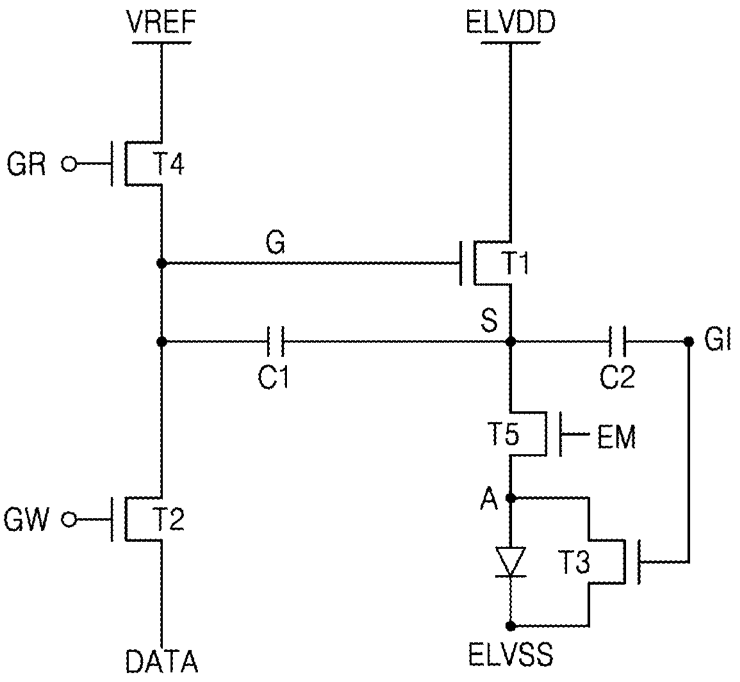
FIG. 2 is a circuit diagram illustrating one example of a pixel of the display device of FIG. 1.
Figure 3:
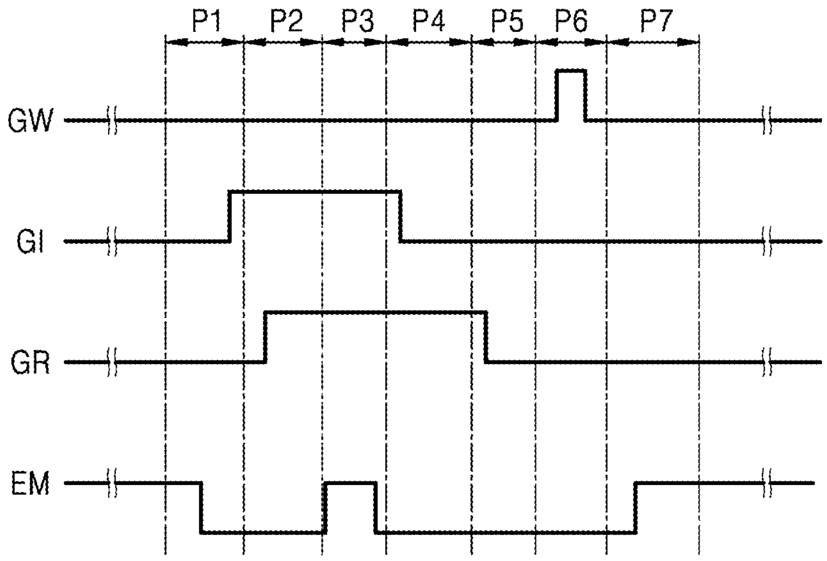
FIG. 3 is a timing diagram illustrating one example of input signals applied to the pixel of FIG. 2.

FIG. 2 is a circuit diagram illustrating one example of a pixel of the display device of FIG. 1, and FIG. 3 is a timing diagram illustrating one example of input signals applied to the pixel of FIG. 2.

Referring to FIG. 2, the pixel of the display device according to one or more embodiments of the present disclosure may include a first transistor T1 including a gate electrode connected to a node G (hereinafter, a first node G), a first electrode to receive a first power voltage ELVDD, and an a second electrode connected to a node S (hereinafter, a second node S), a second transistor T2 including a gate electrode to receive a first gate signal GW, a first electrode connected to the first node G, and a second electrode to receive a data voltage DATA, a third transistor T3 including a gate electrode to receive a second gate signal GI, a first electrode connected to a node A (hereinafter, a third node A), and a second electrode to receive a second power voltage ELVSS, a fourth transistor T4 including a gate electrode to receive a third gate signal GR, a first electrode to receive a third power voltage VREF, and a second electrode connected to the first node G, a fifth transistor T5 including a gate electrode to receive a first emission control signal EM, a first electrode connected to the second node S, and a second electrode connected to the third node A, a first capacitor C1 including a first electrode connected to the first node G, and a second electrode connected to the second node S, a second capacitor C2 including a first electrode connected to the second node S, and a second electrode to receive the second gate signal GI, and a light-emitting element including a first electrode connected to the third node A, and a second electrode to receive the second power voltage ELVSS.

In one or more embodiments, the pixel illustrated in FIG. 2 may receive the first gate signal GW, the second gate signal GI, the third gate signal GR, the data voltage DATA, and the emission control signal EM, and may display an image by emitting light from the light-emitting element according to a level of the data voltage DATA.

In the present disclosure, as illustrated in FIG. 2, the first to fifth transistors T1 to T5 may be implemented as NMOS transistors. As the first to fifth transistors are implemented as the NMOS transistors, the first to fifth transistors may be turned on based on a high-level signal (hereinafter, a first signal), and may be turned off based on a low-level signal (hereinafter, a second signal).

In one or more embodiments, the first transistor T1 may include the gate electrode connected to the first node G, the first electrode for receiving the first power voltage ELVDD, and the second electrode connected to the second node S. The first transistor T1 may be turned on or off based on a voltage applied to the gate electrode. The first transistor T1 may generate a driving current in response to the data voltage DATA. When the fifth transistor T5 is turned on, the first transistor T1 may supply the driving current to the first electrode of the light-emitting element.

In one or more embodiments, the second transistor T2 may include the gate electrode for receiving the first gate signal GW, the first electrode connected to the first node G, and the second electrode for receiving the data voltage DATA. The second transistor T2 may be turned on or off based on the first gate signal GW. The second transistor T2 may be connected to the first transistor T1 at the first node G. When turned on based on the first gate signal GW, the second transistor T2 may apply the data voltage VDATA to the gate electrode of the first transistor T1. In one or more embodiments, the second transistor T2 may be turned on in the writing period P6.

In one or more embodiments, the third transistor T3 may include the gate electrode for receiving the second gate signal GI, the first electrode connected to the third node A, and the second electrode for receiving the second power voltage ELVSS. The third transistor T3 may be turned on or off based on the second gate signal GI. The third transistor T3 may be connected to the light-emitting element at the third node A. In one or more embodiments, the third transistor T3 may be turned on in the first initialization period P1, and may apply the second power voltage ELVSS to the first electrode of the light-emitting element and the third node A. Meanwhile, the third transistor T3 may be connected to the fifth transistor T5 at the third node A. In one or more embodiments, the third transistor T3 may be turned on in the third initialization period P3, and may apply the second power voltage ELVSS to the second node S and to the first electrode of the fifth transistor T5.

In one or more embodiments, the fourth transistor T4 may include the gate electrode for receiving the third gate signal GR, the first electrode for receiving the third power voltage VREF, and the second electrode connected to the first node G. The fourth transistor may be turned on or off based on the third gate signal GR. Meanwhile, the fourth transistor T4 may be connected to the first transistor T1 at the first node G. When the fourth transistor T4 is turned on, the third power voltage VREF may be applied to the gate electrode of the first transistor T1. For example, the fourth transistor T4 may be turned on in the second initialization period P2, the third initialization period P3, and the compensation period P4, and may apply the third power voltage VREF to the gate electrode of the first transistor T1. Additionally, the fourth transistor T4 may be connected to the first capacitor C1 at the first node G. When the fourth transistor T4 is turned on, the third power voltage VREF may be applied to the first electrode of the first capacitor C1. For example, the fourth transistor T4 may be turned on in the second initialization period P2, the third initialization period P3, and the compensation period P4, and may apply the third power voltage VREF to the first electrode of the first capacitor C1.

In one or more embodiments, the fifth transistor T5 may include the gate electrode for receiving the first emission control signal EM, the first electrode connected to the second node S, and the second electrode connected to the third node A. The fifth transistor T5 may be turned on or off based on the first emission control signal EM. Meanwhile, the fifth transistor T5 may be connected to the first transistor T1 at the second node S. For example, when the fifth transistor T5 is turned on, the voltage applied to the third node A may be provided to the second node S. For example, the fifth transistor T5 may be turned on in the third initialization period P3, and may apply the second power voltage ELVSS to the second node S. As another example, when the fifth transistor T5 is turned on, the fifth transistor T5 may apply the driving current supplied from the first transistor T1 to the third node A. For example, the fifth transistor T5 may be turned on in the emission period P7 and may apply the driving current to the light-emitting element.

a. In one or more embodiments, the first capacitor C1 may include the first electrode connected to the first node G, and the second electrode connected to the second node S. The first capacitor C1 may be connected to the gate electrode of the first transistor T1, the first electrode of the second transistor T2, and the second electrode of the fourth transistor T4 at the first node G. Additionally, the first capacitor C1 may be connected to the second electrode of the first transistor T1 at the second node S. In one or more embodiments, the first capacitor C1 may store a corresponding voltage to compensate for a threshold voltage of the first transistor T1. For example, the first capacitor C1 may store some of voltages supplied from the second gate signal GI in the compensation period P4 and the writing period P6.

In one or more embodiments, the second capacitor C2 may include the first electrode connected to the second node S, and the second electrode for receiving the second gate signal GI. The second capacitor C2 may be connected to the second electrode of the first transistor T1 and to the first capacitor C1 at the second node S. In one or more embodiments, the second capacitor C2 may store a corresponding voltage to compensate for the threshold voltage of the first transistor T1. For example, the second capacitor C2 may store a part of a voltage supplied from the second gate signal GI in the compensation period P4 and the writing period P6. In more detail, the first capacitor C1 and the second capacitor C2 may store, in a dividing manner, parts of the voltage supplied from the second gate signal GI based on a capacitor capacity ratio. Through this, the threshold voltage of the first transistor T1 can be compensated in the compensation period P4 and the writing period P6, as will be described later. Meanwhile, the capacity of the first capacitor C1 and the capacity of the second capacitor C2 may be a preset value. For example, the capacity of the first capacitor C1 and the capacity of the second capacitor C2 may be about 200 fF.

In one or more embodiments, the light-emitting element may be implemented as an organic light-emitting diode (OLED). The light-emitting element may include the first electrode connected to the third node A, and the second electrode for receiving the second power voltage. As an example, the light-emitting element may be connected to the third transistor T3 at the third node A. For example, in the first initialization period P1, the second power voltage ELVSS may be applied from the third transistor T3 to initialize the first electrode of the light-emitting element. As another example, the light-emitting element may be connected to the fifth transistor T5 at the third node A. For example, in the emission period P7, the driving current may be applied from the fifth transistor T5, and the light-emitting element may emit light based on the driving current.

Meanwhile, the first power voltage ELVDD, the second power voltage ELVSS, and the third power voltage VREF may be preset values. For example, the first power voltage ELVDD may be about 13 V, the second power voltage ELVSS may be about 1 V, and the third power voltage VREF may be about −2 V.

Referring to FIG. 3, the operation of the pixel according to one or more embodiments may be controlled based on the first gate signal GW, the second gate signal GI, the third gate signal GR, and the emission control signal EM. In more detail, the operation of the pixel may be divided into a first period P1 to a seventh period P7 based on signal states of the first gate signal GW, the second gate signal GI, the third gate signal GR, and the emission control signal EM. Here, the signal state of each of the first gate signal GW, the second gate signal GI, the third gate signal GR, and the emission control signal EM may be any one of a first signal that is a relatively high-level signal, and a second signal that is a signal having a lower level than the first signal. In another aspect, the first signal may mean a high signal, and the second signal may mean a low signal.

According to one or more embodiments, in the first period P1, the first gate signal GW and the third gate signal GR may be the second signal. In addition, the second gate signal GI may change from the second signal to the first signal, and the emission control signal EM may change from the first signal to the second signal. In one or more embodiments, the second transistor T2, the fourth transistor T4, and the fifth transistor T5 may be turned off when each of the first gate signal GW, the third gate signal GR, and the emission control signal EM is the second signal. In addition, the third transistor T3 may be turned on when the second gate signal GI changes to the first signal. In response to the third transistor T3 being turned on, the voltage of the third node A may be initialized to the second power voltage ELVSS. In another aspect, the first period P1 may be referred to as a first initialization period in which the third node A is initialized.

According to one or more embodiments, in the second period P2, each of the first gate signal GW and the emission control signal EM may be the second signal. Additionally, the second gate signal GI may be the first signal, and the third gate signal GR may change from the second signal to the first signal. In one or more embodiments, the second transistor T2 and the fifth transistor T5 may be turned off when each of the first gate signal GW and the emission control signal EM is the second signal. The third transistor T3 and the fourth transistor T4 may be turned off when each of the second gate signal GI and the third gate signal GR is the first signal. In response to the fourth transistor T4 being turned on, the voltage of the first node G may be initialized to the third power voltage VREF, and the first transistor T1 may be turned off. In another aspect, the second period P2 may be referred to as a second initialization period in which the first node G is initialized. As the first node G is initialized, the voltage applied to the gate electrode of the first transistor T1 may be the third power voltage VREF.

According to one or more embodiments, the first gate signal GW may be the second signal in the third period P3. In addition, the second gate signal GI and the third gate signal GR may be the first signal, and the emission control signal EM may change from the second signal to the first signal. In one or more embodiments, the second transistor T2 may be turned off when the first gate signal GW is the second signal. In addition, the third transistor T3 and the fifth transistor T5 may be turned on when each of the second gate signal GI and the emission control signal EM is the first signal, ultimately leading to initialization of the voltage of the second node S to the second power voltage ELVSS. In another aspect, the third period P3 may be referred to as a third initialization period in which the second node S is initialized. As the second node S is initialized, the voltage applied to the second electrode of the first transistor T1 may be the second power voltage ELVSS.

According to one or more embodiments, in the fourth period P4, each of the first gate signal GW and the emission control signal EM may be the second signal, and the third gate signal GR may be the first signal. Additionally, the second gate signal GI may change from the first signal to the second signal. In one or more embodiments, because only the third gate signal GR is the first signal, the fourth transistor T4 may be turned on, and the remaining transistors T1, T2, T3, and T5 may be turned off. As the second gate signal GI changes from the first signal to the second signal, a level of a voltage applied from the second gate signal GI may change. In addition, the level of the voltage applied to the second node S may also change. The first capacitor C1 and the second capacitor C2, which are connected to each other at the second node S, may store in a dividing manner a voltage variation applied from the second gate signal GI based on the capacitor capacity ratio, and may adjust the change in level of the voltage applied to the second node S. In one or more embodiments, when a corresponding time has elapsed because the second gate signal GI changed from the first signal to the second signal, a difference between a voltage applied to the first node G and a voltage applied to the second node S may be the same as the threshold voltage of the first transistor T1. At this point, the first transistor T1 may be turned on. In another aspect, the threshold voltage of the first transistor T1 may be compensated when the second gate signal GI changes from the first signal to the second signal and when the third gate signal GR is the first signal. That is, the fourth period may be referred to as a compensation period in which the threshold voltage of the first transistor T1 is compensated. In addition, at the moment when the first transistor T1 is turned on, a voltage applied to the gate electrode of the first transistor T1 may be the same as the sum of a voltage applied to the second electrode of the first transistor T1 and the threshold voltage of the first transistor T1.

According to one or more embodiments, in the second period P5, each of the first gate signal GW, the second gate signal GI, and the emission control signal EM may be the second signal. Additionally, the third gate signal GR may change from the first signal to the second signal. In other words, the fifth period P5 may be referred to as an off period in which all transistors T1 to T5 are turned off when every signal is the second signal. According to one or more embodiments of the present disclosure, even if the third gate signal GR changes from the first signal to the second signal in the off period P5, a completely compensated threshold voltage may be maintained for the first transistor T1. In addition, even if the first transistor T1 is turned on based on a leakage voltage in the third transistor T3, a completely compensated threshold voltage may be maintained for the first transistor T1.

According to one or more embodiments, in the sixth period P6, each of the second gate signal GI, the third gate signal GR, and the emission control signal EM may be the second signal. In addition, the first gate signal GW may change from the second signal to the first signal. The data voltage DATA may be applied to the first node G when the first gate signal GW is the first signal. In another aspect, the sixth period P6 may be referred to as a writing period in which the data voltage DATA is applied to the gate electrode of the first transistor T1. In the writing period P6, the first transistor T1 may be turned on.

According to one or more embodiments, in the seventh period P7, each of the first gate signal GW, the second gate signal GI, and the third gate signal GR may be the second signal. In addition, the emission control signal EM may change from the second signal to the first signal. The fifth transistor T5 may be turned on when the emission control signal EM is the first signal. In response to the fifth transistor T5 being turned on, a driving current applied from the first transistor T1 may be provided to the light-emitting element. In another aspect, the seventh period P7 may be referred to as an emission period.

Figure 4:
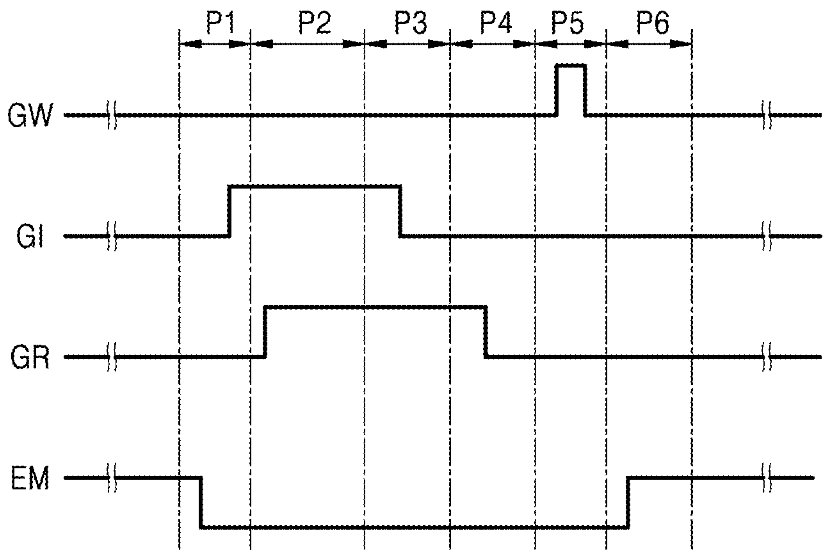
FIG. 4 is a timing diagram illustrating another example of input signals applied to the pixel of FIG. 2.

FIG. 4 is a timing diagram illustrating another example of input signals applied to the pixel of FIG. 2.

Referring to FIG. 4, the operation of the pixel according to one or more embodiments of the present disclosure may be divided into a first period P1 to a sixth period P6 based on signal states of the first gate signal GW, the second gate signal GI, the third gate signal GR, and the emission control signal EM.

The first period P1 illustrated in FIG. 4 may be the same as the first initialization period described above in FIG. 3, and the second period P2 may be the same as the second initialization section described above in FIG. 3. In addition, the third period P3 may be the same as the compensation period described above in FIG. 3, the fourth period P4 may be the same as the off period described above in FIG. 3, the fifth period P5 may be the same as the writing period described above in FIG. 3, and the sixth period P6 may be the same as the emission period described above in FIG. 3. Because the description of each period is the same as that given above in FIG. 3, redundant descriptions will be omitted.

According to one or more embodiments, the operation of the pixel may omit the third initialization period (e.g., the third period P3 in FIG. 3). In one or more embodiments, when the threshold voltage of the first transistor T1 can be compensated based on a voltage applied to the second electrode of the first transistor T1 in the third period P3, the third initialization period in which the voltage applied to the second electrode of the first transistor T1 is initialized may be omitted. In more detail, according to one or more embodiments, the range of the voltage applied to the second electrode of the first transistor T1 may be set according to a preset range of power voltage values. The third initialization period may be omitted if the threshold voltage of the first transistor T1 can be compensated based on the maximum voltage applied to the second electrode of the first transistor T1.

Figure 5:
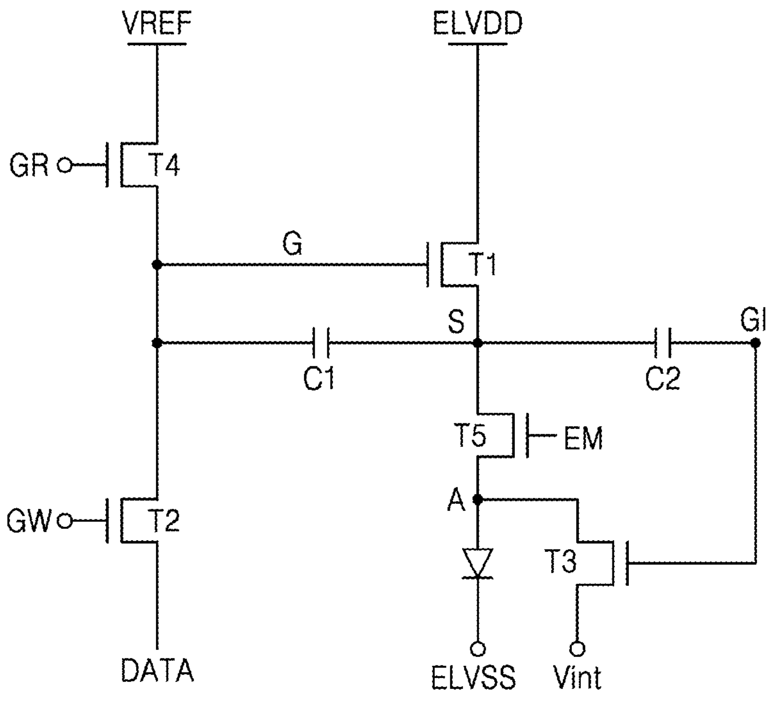
FIG. 5 is a circuit diagram illustrating another example of a pixel of the display device of FIG. 1.

FIG. 5 is a circuit diagram illustrating another example of a pixel of the display device of FIG. 1.

Referring to FIG. 5, in the pixel according to one or more embodiments of the present disclosure, the third transistor T3 may include the gate electrode for receiving the second gate signal GI, the first electrode connected to the third node A, and the second electrode for receiving the initialization voltage Vint.

In one or more embodiments, the third transistor T3 may be turned on or off based on the second gate signal GI. The third transistor T3 may be connected to the light-emitting element at the third node A. In one or more embodiments, the third transistor T3 may be turned on in the first initialization period P1 and may apply the initialization voltage Vint to the first electrode of the light-emitting element and the third node A. Meanwhile, the third transistor T3 may be connected to the fifth transistor T5 at the third node A. In one or more embodiments, the third transistor T3 may be turned on in the third initialization period P3, and may apply the initialization voltage Vint to the third node A and the second electrode of the fifth transistor T5.

Figure 6:
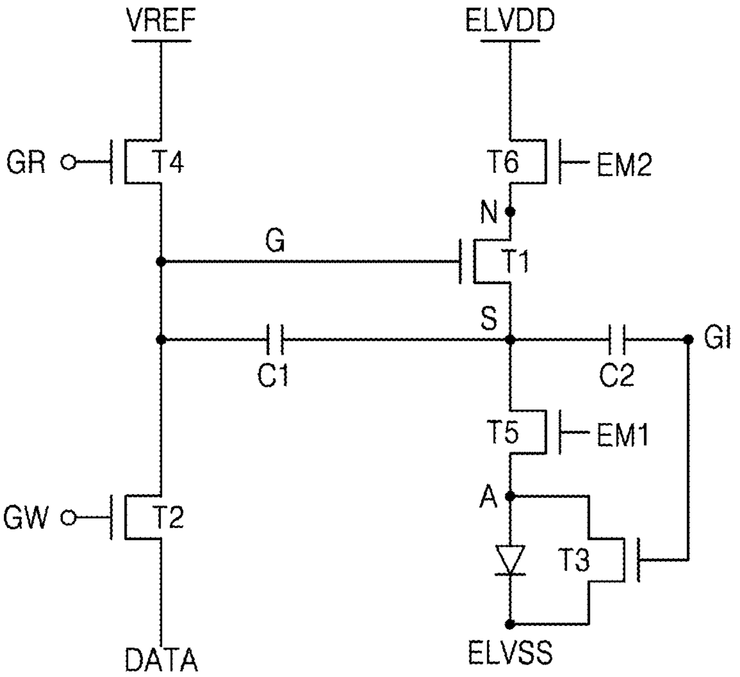
FIG. 6 is a circuit diagram illustrating another example of a pixel of the display device of FIG. 1.
Figure 7:
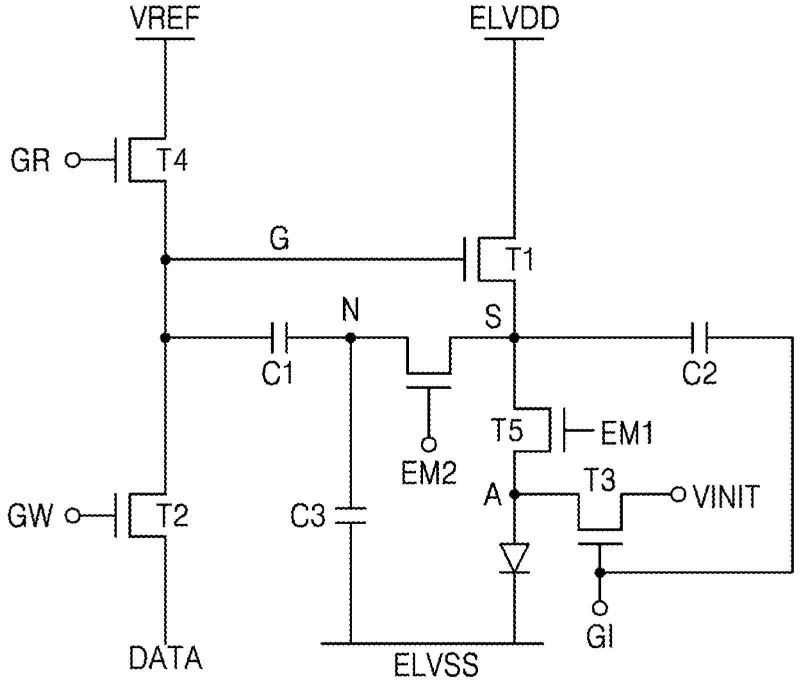
FIG. 7 is a circuit diagram illustrating another example of a pixel of the display device of FIG. 1.
Figure 8:
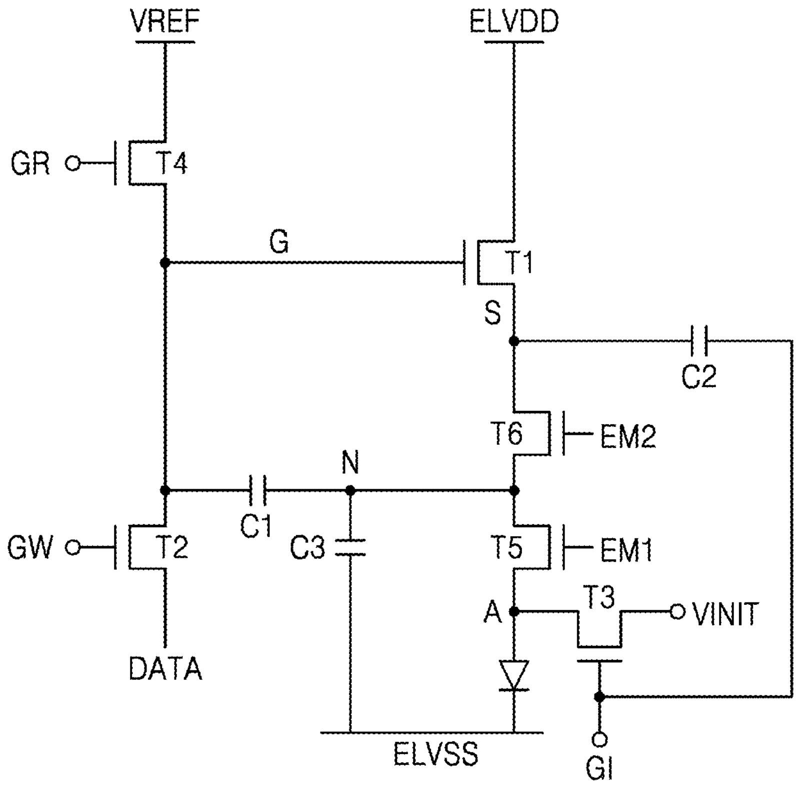
FIG. 8 is a circuit diagram illustrating another example of a pixel of the display device of FIG. 1.
Figure 9:
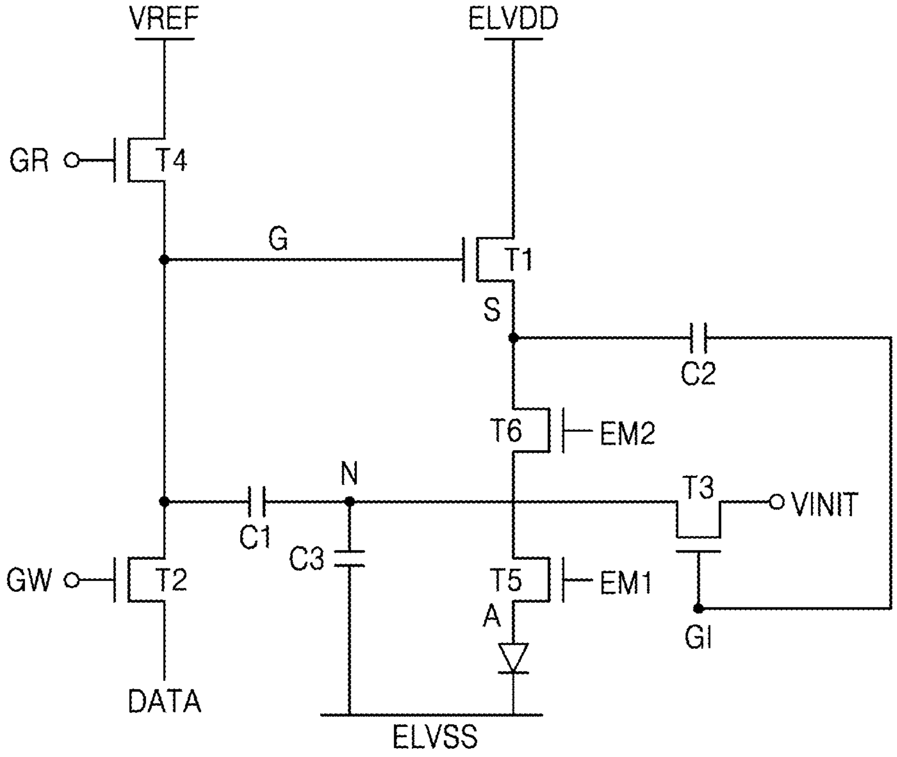
FIG. 9 is a circuit diagram illustrating another example of a pixel of the display device of FIG. 1.
Figure 10:
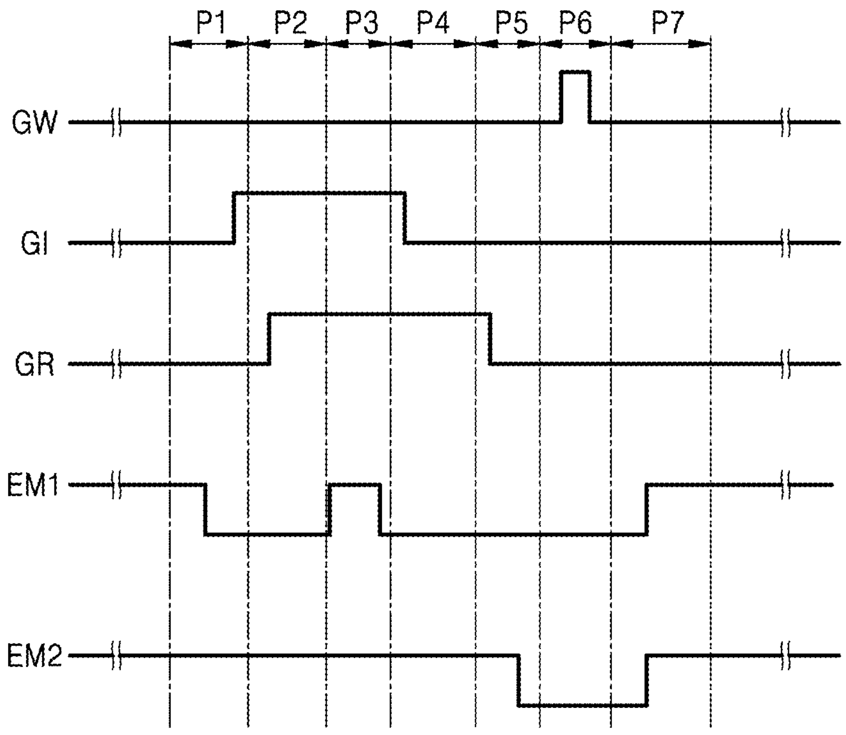
FIG. 10 is a timing diagram illustrating one example of input signals applied to the pixels of FIGS. 6 to 9.

FIG. 6 is a circuit diagram illustrating another example of a pixel of the display device of FIG. 1, and FIG. 7 is a circuit diagram illustrating still another example of a pixel of the display device of FIG. 1. FIG. 8 is a circuit diagram illustrating another example of a pixel of the display device of FIG. 1. FIG. 9 is a circuit diagram illustrating still another example of a pixel of the display device of FIG. 1. FIG. 10 is a timing diagram illustrating one example of input signals applied to the pixels of FIGS. 6 to 9.

In the present disclosure, as illustrated in FIGS. 6 to 9, the first to sixth transistors T1 to T6 may be implemented as NMOS transistors. As the first to sixth transistors are implemented as the NMOS transistors, the first to sixth transistors may be turned on based on a high-level signal (hereinafter, a first signal) and turned off based on a low-level signal (hereinafter, a second signal).

Referring to FIG. 6, the pixel according to one or more embodiments of the present disclosure may further include a sixth transistor T6.

In one or more embodiments, the sixth transistor T6 may include a gate electrode for receiving a second emission control signal EM2, a first electrode for receiving the first power voltage ELVDD, and a second electrode connected to a node N (hereinafter, a fourth node N).

In one or more embodiments, the sixth transistor T6 may be turned on or off based on the second emission control signal EM2. Meanwhile, the sixth transistor T6 may be connected to the first transistor T1 at the fourth node N. When the sixth transistor T6 is turned on, the first power voltage ELVDD may be applied to the first transistor T1. For example, the sixth transistor T6 may be turned on in the emission period P7, and may apply the first power voltage ELVDD to the first electrode of the first transistor T1.

Meanwhile, in one or more embodiments, the first electrode of the first transistor T1 may be connected to the sixth transistor T6 at the fourth node N. As described above, the first transistor T1 may receive the first power voltage ELVDD from the sixth transistor T6 in the emission period P7. In addition, the fifth transistor T5 may receive the first emission control signal EM1.

Referring to FIG. 7, the pixel according to one or more embodiments of the present disclosure may further include a sixth transistor T6 and a third capacitor C3.

In one or more embodiments, the sixth transistor T6 may include a gate electrode for receiving the second emission control signal EM2, a first electrode connected to the second node S, and a second electrode connected to the fourth node N. In addition, the third capacitor C3 may include a first electrode connected to the fourth node N, and a second electrode for receiving the second power voltage ELVSS.

As illustrated in FIG. 7, the sixth transistor T6 may be connected to the first transistor T1 and to the second capacitor C2 at the second node S. In addition, the sixth transistor T6 may be connected to the first capacitor C1, the third capacitor C3, and the fifth transistor T5 at the fourth node N. The third capacitor C3 may be connected to the first capacitor C1 at the fourth node N.

Meanwhile, as illustrated in FIG. 7, the second electrode of the first capacitor C1 may be connected to the fourth node N.

In one or more embodiments, the sixth transistor T6 may be turned on or off based on the second emission control signal EM2. The operation of the sixth transistor T6 will be described later.

Referring to FIG. 8, the pixel according to one or more embodiments of the present disclosure may further include a sixth transistor T6 and a third capacitor C3.

In one or more embodiments, the sixth transistor T6 may include a gate electrode for receiving the second emission control signal EM2, a first electrode connected to the second node S, and a second electrode connected to the fourth node N. In addition, the third capacitor C3 may include a first electrode connected to the fourth node N, and a second electrode for receiving the second power voltage ELVSS.

As illustrated in FIG. 8, the sixth transistor T6 may be connected to the first transistor T1 and to the second capacitor C2 at the second node S. In addition, the sixth transistor T6 may be connected to the fifth transistor T5, to the first capacitor C1, and to the third capacitor C3 at the fourth node N. The third capacitor C3 may be connected to the first capacitor C1 and to the fifth transistor T5 at the fourth node N.

Meanwhile, as illustrated in FIG. 8, the second electrode of the first capacitor C1 may be connected to the fourth node N. Additionally, the first electrode of the fifth transistor T5 may be connected to the fourth node N.

In one or more embodiments, the sixth transistor T6 may be turned on or off based on the second emission control signal EM2. The operation of the sixth transistor T6 will be described later.

Referring to FIG. 9, the pixel according to one or more embodiments of the present disclosure may further include a sixth transistor T6 and a third capacitor C3.

In one or more embodiments, the sixth transistor T6 may include a gate electrode for receiving the second emission control signal EM2, a first electrode connected to the second node S, and a second electrode connected to the fourth node N. In addition, the third capacitor C3 may include a first electrode connected to the fourth node N and a second electrode for receiving the second power voltage ELVSS.

As illustrated in FIG. 9, the sixth transistor T6 may be connected to the first transistor T1 and the second capacitor C2 at the second node S. Additionally, the sixth transistor T6 may be connected to the third transistor T3, the fifth transistor T5, the first capacitor C1, and the third capacitor C3 at the fourth node N. The third capacitor C3 may be connected to the first capacitor C1, the third transistor T3, and the fifth transistor T5 at the fourth node N.

Meanwhile, as illustrated in FIG. 9, the second electrode of the first capacitor C1 may be connected to the fourth node N. In addition, the first electrode of the fifth transistor T5 may be connected to the fourth node N. Also, the first electrode of the third transistor T3 may be connected to the fourth node N.

In one or more embodiments, the sixth transistor T6 may be turned on or off based on the second emission control signal EM2. The operation of the sixth transistor T6 will be described later.

Referring to FIG. 10, the operation of the pixel according to one or more embodiments may be controlled based on the first gate signal GW, the second gate signal GI, the third gate signal GR, the first emission control signal EM1, and the second emission control signal EM2.

In one or more embodiments of the present disclosure, as for the pixel further including the sixth transistor T6 that receives the second emission control signal EM2, it can be understood that the operation is controlled based on the timing diagram illustrated in FIG. 10.

In one or more embodiments, the operation of the pixel may be divided into a first period P1 to a seventh period P7 based on signal states of the first gate signal GW, the second gate signal GI, the third gate signal GR, the first emission control signal EM1, and the second emission control signal EM2. Here, the signal state of each of the first gate signal GW, the second gate signal GI, the third gate signal GR, the first emission control signal EM1, and the second emission control signal EM2 may be any one of a first signal that is a relatively high-level signal, and a second signal that is lower than the first signal. In another aspect, the first signal may mean a high signal, and the second signal may mean a low signal.

As illustrated in FIG. 10, it can be confirmed that, except that the flow of the second emission control signal EM2 is added, the flows of other signals that control the operation of the pixel are the same as the signal flows illustrated in FIG. 3. Therefore, in FIG. 10, only the operation of the pixel according to the flow of the second emission control signal EM2 will be described.

Referring to FIG. 10, it is illustrated that the second emission control signal EM2 is the first signal in the first to fourth periods P1 to P4, changes to the second signal in the fifth period P5, is maintained as the second signal in the sixth period P6, and changes back to the first signal in the seventh period P7.

In one or more embodiments, the second emission control signal EM2 may be the second signal in the sixth period P6 in which the first gate signal GW changes to the first signal. In another aspect, the sixth transistor T6 that receives the second emission control signal EM2 may be turned off only in the sixth period P6. According to one or more embodiments, in the writing period in which a data voltage is applied through the second transistor T2, the sixth transistor T6 may be turned off, thereby reducing transmission loss of the data voltage.

Figure 11:
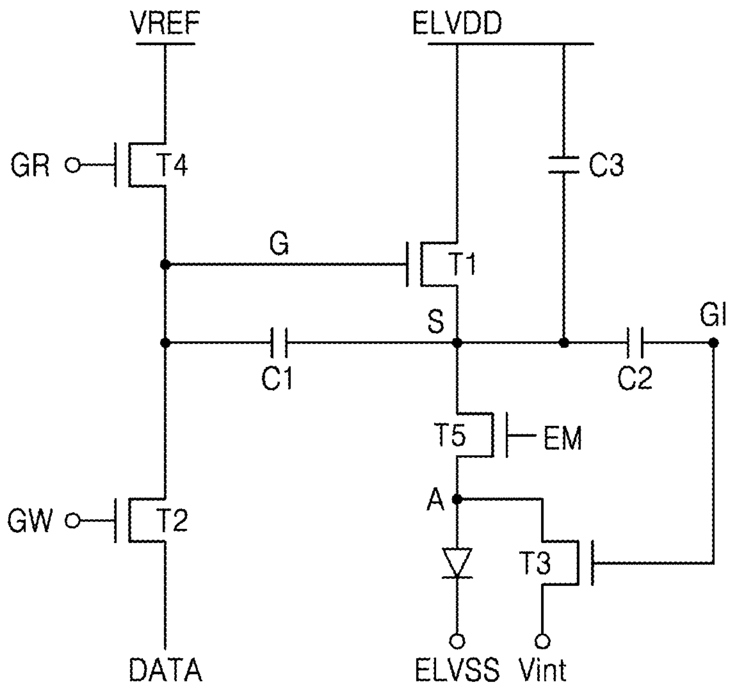
FIG. 11 is a circuit diagram illustrating another example of a pixel of the display device of FIG. 1.

FIG. 11 is a circuit diagram illustrating another example of a pixel of the display device of FIG. 1.

Referring to FIG. 11, the pixel according to one or more embodiments of the present disclosure may further include a third capacitor C3.

In one or more embodiments, the third capacitor C3 may include a first electrode for receiving the first power voltage ELVDD, and a second electrode connected to the second node S.

As illustrated in FIG. 11, the third capacitor C3 may be connected to the first capacitor C1 and to the second capacitor C2 at the second node S.

According to one or more embodiments, the third capacitor C3 may adjust distribution of voltages stored in the first capacitor C1 and the second capacitor C2 based on a capacitor capacity ratio.

A pixel according to one or more embodiments of the present disclosure can implement a display device that performs initialization and compensation with a relatively simple 5T2C circuit configuration. Accordingly, a pixel that is advantageous in terms of integration and a display device including the same can be implemented.

However, the aspects of the present disclosure are not limited to the aspects described above, and may be expanded in various ways without departing from the technical idea and scope of the present disclosure.

Each of the embodiments described above can be implemented independently, but the structure of each of the embodiments can be applied in combination to other embodiments.

As such, the present disclosure has been described with reference to the embodiments illustrated in the drawings, but is merely illustrative, and it will be understood by those skilled in the art that various modifications and variations of the embodiments can be made therefrom. Therefore, the true technical protection scope of the present disclosure should be defined by the technical idea of the appended claims.

The implementations described in the present disclosure are merely illustrative, and do not limit the scope of the present disclosure in any way. Furthermore, unless otherwise indicated obviously by terms, such as "essential," "important," etc., a component may not be a necessary component for the application of the present disclosure.

In the specification (e.g., in the claims), the use of the term "the" and similar referential terms may refer to both the singular and the plural. In addition, when a range is described, embodiments to which individual values belonging to the range are applied is included (unless otherwise described contrarily), and each individual value constituting the range is described in the detailed description. Finally, unless an order of operations constituting the method according to the embodiment is explicitly described or a reverse order is not mentioned, those operations may be carried out in any suitable order. The embodiments are not necessarily limited by the order of operations described above. The use of any examples or illustrative terms in the embodiment is merely to describe the embodiment in detail, and unless limited by the claims, the scope of the embodiment is not limited by the examples or illustrative terms. Additionally, it will be understood by those skilled in the art that various modifications, combinations and changes may be made depending on design conditions and factors within the scope of the appended claims or their equivalents.

What is claimed is:

1. A pixel comprising:

a first transistor comprising a gate electrode connected to a first node, a first electrode to receive a first power voltage, and a second electrode connected to a second node;

a second transistor comprising a gate electrode to receive a first gate signal, a first electrode connected to the first node, and a second electrode to receive a data voltage;

a third transistor comprising a gate electrode to receive a second gate signal, a first electrode connected to a third node, and a second electrode;

a fourth transistor comprising a gate electrode to receive a third gate signal, a first electrode to receive a third power voltage, and a second electrode connected to the first node;

a fifth transistor comprising a gate electrode to receive a first emission control signal, a first electrode connected to the second node, and a second electrode connected to the third node;

a first capacitor comprising a first electrode connected to the first node, and a second electrode;

a second capacitor comprising a first electrode connected to the second node, and a second electrode to receive the second gate signal; and a light-emitting element comprising a first electrode connected to the third node, and a second electrode to receive a second power voltage.

2. The pixel of claim 1, further comprising a third capacitor comprising a first electrode to receive the first power voltage, and a second electrode connected to the second node.

3. The pixel of claim 1, wherein the second electrode of the third transistor is for receiving an initialization voltage.

4. The pixel of claim 3, further comprising:

a sixth transistor comprising a gate electrode to receive a second emission control signal, a first electrode connected to the second node, and a second electrode connected to a fourth node; and a third capacitor comprising a first electrode connected to the fourth node, and a second electrode to receive the second power voltage, wherein the second electrode of the first capacitor is connected to the fourth node.

5. The pixel of claim 3, further comprising:

a sixth transistor comprising a gate electrode to receive a second emission control signal, a first electrode connected to the second node, and a second electrode connected to a fourth node; and a third capacitor comprising a first electrode connected to the fourth node, and a second electrode to receive the second power voltage, wherein the first electrode of the fifth transistor is connected to the fourth node, and the second electrode of the first capacitor is connected to the fourth node.

6. The pixel of claim 5, wherein the first electrode of the third transistor is connected to the fourth node.

7. The pixel of claim 1, further comprising a sixth transistor comprising a gate electrode to receive a second emission control signal, a first electrode to receive the first power voltage, and a second electrode connected to a fourth node, wherein the first electrode of the first transistor is connected to the fourth node.

8. The pixel of claim 1, wherein a threshold voltage of the first transistor is configured to be compensated when the second gate signal changes from a first signal to a second signal, and when the third gate signal is the first signal.

9. The pixel of claim 8, wherein, when the first transistor is turned on, a voltage applied to the gate electrode of the first transistor is equal to a sum of a voltage applied to the second electrode of the first transistor and the threshold voltage of the first transistor.

10. The pixel of claim 1, wherein a compensated threshold voltage is configured to be maintained for the first transistor when the first transistor, the second transistor, the third transistor, the fourth transistor, and the fifth transistor are turned off, and when the first gate signal, the second gate signal, the third gate signal, and the first emission control signal are a second signal.

11. A display device comprising:

a scan driver for transmitting scan signals to scan lines;

a data driver for transmitting data signals to data lines;

a display unit comprising pixels connected to the scan lines and the data lines, and configured to emit light according to corresponding data signals to display an image; and a controller for controlling the scan driver and the data driver, for generating the data signals, and for applying the data signals to the data driver, wherein the pixels comprise:

a first transistor comprising a gate electrode connected to a first node, a first electrode to receive a first power voltage, and a second electrode connected to a second node;

a second transistor comprising a gate electrode to receive a first gate signal, a first electrode connected to the first node, and a second electrode to receive a data voltage;

a third transistor comprising a gate electrode to receive a second gate signal, a first electrode connected to a third node, and a second electrode;

a fourth transistor comprising a gate electrode to receive a third gate signal, a first electrode to receive a third power voltage, and a second electrode connected to the first node;

a fifth transistor comprising a gate electrode to receive a first emission control signal, a first electrode connected to the second node, and a second electrode connected to the third node;

a first capacitor comprising a first electrode connected to the first node, and a second electrode;

a second capacitor comprising a first electrode connected to the second node, and a second electrode to receive the second gate signal; and a light-emitting element comprising a first electrode connected to the third node, and a second electrode to receive a second power voltage.

12. The display device of claim 11, wherein the pixels further comprise a third capacitor comprising a first electrode to receive the first power voltage, and a second electrode connected to the second node.

13. The display device of claim 11, wherein the second electrode of the third transistor is configured to receive an initialization voltage.

14. The display device of claim 13, wherein the pixels further comprise:

a sixth transistor comprising a gate electrode to receive a second emission control signal, a first electrode connected to the second node, and a second electrode connected to a fourth node; and a third capacitor comprising a first electrode connected to the fourth node, and a second electrode to receive the second power voltage, and wherein the second electrode of the first capacitor is connected to the fourth node.

15. The display device of claim 13, wherein the pixels further comprises:

a sixth transistor comprising a gate electrode to receive a second emission control signal, a first electrode connected to the second node, and a second electrode connected to a fourth node; and a third capacitor comprising a first electrode connected to the fourth node, and a second electrode to receive the second power voltage, wherein the first electrode of the fifth transistor is connected to the fourth node, and wherein the second electrode of the first capacitor is connected to the fourth node.

16. The display device of claim 15, wherein the first electrode of the third transistor is connected to the fourth node.

17. The display device of claim 11, wherein the pixels further comprise a sixth transistor comprising a gate electrode to receive a second emission control signal, a first electrode to receive the first power voltage, and a second electrode connected to a fourth node, and wherein the first electrode of the first transistor is connected to the fourth node.

18. The display device of claim 11, wherein a threshold voltage of the first transistor is configured to be compensated when the second gate signal changes from a first signal to a second signal, and when the third gate signal is the first signal.

19. The display device of claim 11, wherein a compensated threshold voltage is configured to be maintained for the first transistor when the first transistor, the second transistor, the third transistor, the fourth transistor, and the fifth transistor are turned off, and when the first gate signal, the second gate signal, the third gate signal, and the first emission control signal are a second signal.

20. An electronic device comprising a display device comprising:

a scan driver for transmitting scan signals to scan lines;

a data driver for transmitting data signals to data lines;

a display unit comprising pixels connected to the scan lines and the data lines, and configured to emit light according to corresponding data signals to display an image; and a controller for controlling the scan driver and the data driver, for generating the data signals, and for applying the data signals to the data driver, wherein the pixels comprise:

a first transistor comprising a gate electrode connected to a first node, a first electrode to receive a first power voltage, and a second electrode connected to a second node;

a second transistor comprising a gate electrode to receive a first gate signal, a first electrode connected to the first node, and a second electrode to receive a data voltage;

a third transistor comprising a gate electrode to receive a second gate signal, a first electrode connected to a third node, and a second electrode;

a fourth transistor comprising a gate electrode to receive a third gate signal, a first electrode to receive a third power voltage, and a second electrode connected to the first node;

a fifth transistor comprising a gate electrode to receive a first emission control signal, a first electrode connected to the second node, and a second electrode connected to the third node;

a first capacitor comprising a first electrode connected to the first node, and a second electrode;

a second capacitor comprising a first electrode connected to the second node, and a second electrode to receive the second gate signal; and a light-emitting element comprising a first electrode connected to the third node, and a second electrode to receive a second power voltage.

* * * * *